United States Patent Office 3,725,231
Patented Apr. 3, 1973

3,725,231
PHOTOSENSITIVE DIACETONE ACRYLAMIDE RESINS
Richard William Jahnke, Mentor on the Lake, Ohio, assignor to The Lubrizol Corporation, Wickliffe, Ohio
No Drawing. Filed Aug. 20, 1971, Ser. No. 173,664
Int. Cl. B01j 1/00; C08d 1/10
U.S. Cl. 204—159.14                                    7 Claims

ABSTRACT OF THE DISCLOSURE

Diacetone acrylamide and analogous substituted acrylamides react with aldehydes containing conjugate unsaturation with respect to the carbonyl group, in the presence of an alkaline reagent, to yield monomeric compounds which are photosensitive and which form photosensitive polymers. The latter can also be prepared by reacting said aldehydes with a diacetone acrylamide polymer while gradually adding said alkaline reagent. The polymers crosslink on exposure to visible or (preferably) ultraviolet radiation and are useful in the preparation of lithographic printing plates, photoresists, etc.

---

This invention relates to new compositions of matter, both monomeric and polymeric, and to methods for their preparation. More particularly, it relates to compounds or mixtures of compounds of the formula (I)
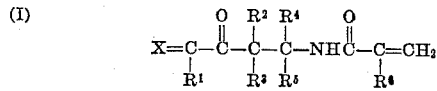

wherein:

X is two hydrogen atoms or Y;
Y is $R^7CH=$;
each of $R^1$, $R^4$ and $R^5$ is hydrogen or a hydrocarbon or substituted hydrocarbon radical;
each of $R^2$ and $R^3$ is hydrogen or a hydrocarbon or substituted hydrocarbon radical, or $(R^2+R^3)$ is Y; with the proviso that at least one of $(R^2+R^3)$ and X is Y;
$R^6$ is hydrogen, halogen or a lower alkyl radical; and
$R^7$ is a hydrocarbon or substituted hydrocarbon radical containing conjugate olefinic or aromatic unsaturation with respect to the olefinic bond in Y.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such form are included.

| | |
|---|---|
| Methyl | Tolyl |
| Ethyl | Xylyl |
| Propyl | Benzyl |
| Butyl | Cyclohexyl |
| Hexyl | Cyclopentyl |
| Octyl | Methylcyclopentyl |
| Decyl | Cyclopentadienyl |
| Vinyl | Vinylphenyl |
| Allyl | Isopropenylphenyl |
| Ethynyl | Cinnamyl |
| Propargyl | Naphthyl |
| Phenyl | |

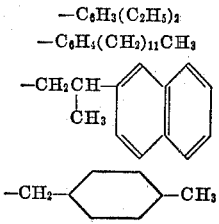

Many obvious variations of these radicals will be apparent to those skilled in the art and are included within the scope of the invention.

Substituted hydrocarbon, alkyl, aryl, etc., radicals are considered fully equivalent to the hydrocarbon, alkyl aryl, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy and heterocyclic ethers)
Ester (especially lower carbalkoxy)
Aminoacyl (amide)
Nitro
Cyano
Mercapto
Thioether
Sulfoxy
Sulfone
Sulfonic acid (and derivatives thereof)

In general, no more than about three such substituent groups will be present for each 10 carbon atoms in the radical.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkyl or aryl radicals, most often alkyl.

As previously indicated, $R^1$, $R^4$ and $R^5$ in the compounds of this invention are each hydrogen or a hydrocarbon or substituted hydrocarbon radical as defined above; $R^1$ is usually hydrogen, and $R^4$ and $R^5$ are usually hydrocarbon radicals. Each of $R^2$ and $R^3$ is hydrogen or (less often) a hydrocarbon or substituted hydrocarbon radical, or $R^2$ and $R^3$ taken together may be the Y substituent as further defined hereinafter. $R^6$ is hydrogen, halogen or lower alkyl, preferably hydrogen or methyl.

The compounds of this invention contain at least one and sometimes two Y radicals, located as indicated in Formula I. Ordinarily, X=Y and each of $R^2$ and $R^3$ is hydrogen. However, compounds in which X consists of two hydrogen atoms and the combination of $R^2$ and $R^3$ is Y are also contemplated, as are compounds where both X and $(R^2+R^3)$ are Y radicals, and mixtures of all these compounds.

The $R^7$ radical is a hydrocarbon or substituted hydrocarbon radical such that $R^7CH=$ contains olefinic or aromatic unsaturation conjugated with the indicated double bond. Thus, $R^7$ may be, for example, any of the following.

CH₂=CH—
C₆H₅—
C₆H₅CH=CH—
ClC₆H₄—
CH₃OC₆H₄—
HOC₆H₄—
CH₃C₆H₄—
C₆H₅C₆H₄—
—C₆H₄—
CH₃CH=CHCH=CH—

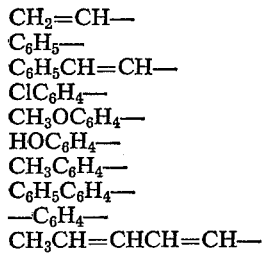

In the preferred compounds, $R^7$ is a furfuryl, phenyl or substituted phenyl (e.g., chlorophenyl, tolyl, phenylphenyl, methoxyphenyl, carboxyphenyl), 2-phenylvinyl or 1,3-pentadienyl radical.

The compounds of this invention may be prepared by reacting an aldehyde of the formula $R^7CHO$ with a substituted acrylamide of the formula (II)    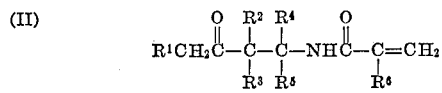

wherein $R^{1-7}$ are as previously defined, in the presence of an alkaline reagent such as sodium hydroxide, potassium hydroxide, sodium carbonate, a quaternary ammonium hydroxide or the like. It will be understood that when either or both of $R^2$ and $R^3$ in Formula II is other than hydrogen, X in Formula I must be Y; on the other hand, if both $R^2$ and $R^3$ in Formula II are hydrogen, Y in Formula I can be in either or both of the locations previously described.

Substituted acrylamides of Formula II wherein $R^6$ is hydrogen or lower alkyl are known in the art and are described, for example, in U.S. Pats. 3,277,056 and 3,425,942. Substituted acrylamides wherein $R^6$ is halogen are disclosed and claimed in copending application Ser. No. 97,055, filed Dec. 10, 1970. Preferred substituted acrylamide for use in preparing the compounds of this invention are N-(1,1-dimethyl-3-oxobutyl)acrylamide, or diacetone acrylamide; N - (1,1-dimethyl-3-oxobutyl)methacrylamide, or diacetone methacrylamide; and N-(1,3-diphenyl-1-methyl-3-oxopropyl)-acrylamide, or diacetophenone acrylamide. Diacetone acrylamide is especially preferred by virtue of its available ability and reactivity.

Generally, the ratio of equivalents of aldehyde (based on the number of aldehyde groups therein) to moles of substituted acrylamide in the reaction mixture is between about 1:1 and 2:1, although an excess of one or the other reagents may be used where appropriate, ratios between about 5:1 and 1:5 being contemplated as part of the invention. The amount of alkaline reagent required is usually very small; frequently a catalytic amount is suitable and in no event need the amount be more than about 10% (by weight) of the combination of aldehyde and substituted acrylamide.

The reaction is ordinarily carried out in a suitable solvent such as water, a lower alkanol, benzene, or a mixture of these. When the reaction is complete, the product may be isolated by known techniques such as distillation, recrystallization and the like.

The preparation of the compounds of this invention is illustrated by the following examples.

EXAMPLE 1

A solution of 169 grams (1 mole) of diacetone acrylamide, 96 grams (1 mole) of furfural, 21.2 grams of sodium carbonate and a trace of 4,4'-methylene-bis-(2,6-di-t-butylphenol) as an antioxidant in 150 ml. of ethanol and 300 ml. of water is heated under reflux for 18 hours. The ethanol is removed by distillation and the aqueous residue is extracted with ether. The ether are washed with water, dried over magnesium sulfate and stripped of volatile materials, yielding the desired furfurylidene derivative of diacetone acrylamide.

EXAMPLE 2

Following the procedure of Example 1, a product is obtained from 169 grams of diacetone acrylamide, 74.2 grams (0.7 mole) of benzaldehyde, 21.2 grams of sodium carbonate, 80 ml. of ethanol, 200 grams of water and a trace of hydroquinone as a stabilizer. The reaction mixture is steam distilled and the residue is then extracted with ether. The ether extract is dried over magnesium sulfate and stripped, and the product is recrystallized from ether to yield a solid which is the desired benzylidene derivative.

EXAMPLE 3

Following the procedure of Example 2, a product is prepared from 94 grams (0.56 mole) of diacetone acrylamide, 54 grams (0.384 mole) of p-chlorobenzaldehyde, 12.1 grams of sodium carbonate, 55 ml. of ethanol, 110 grams of water and a trace of hydroquinone. The product is purified by chromatography on a silica gel column, using benzene as a solvent. The purified p-chlorobenzylidene derivative has a melting point of 80–81° C. and contains 4.77% nitrogen (theory 4.81%).

EXAMPLE 4

Following the procedure of Example 2, a p-tolylidene derivative of diacetone acrylamide is prepared. After recrystallization from cyclohexane, it melts at 96–96.5° C. It has a nitrogen content of 5.09% (theory 5.16%).

EXAMPLE 5

Following the procedure of Example 1, a p-phenylbenzylidene derivative of diacetone acrylamide is prepared from 19 grams (0.112 mole) of diacetone acrylamide, 12.5 grams (0.0686 mole) of p-phenylbenzaldehyde, 3 grams of sodium carbonate, 50 ml. of ethanol, 50 grams of water and a trace of 4,4' - methylene-bis-(2,6-di-t-butylphenol). After heating the mixture under reflux for 6 hours and cooling, the desired product precipitates and is washed with water and dried. It contains 4.0% nitrogen (theory 4.2%).

EXAMPLE 6

A solution of 169 grams of diacetone acrylamide in 150.5 grams of toluene and 135.3 grams of n-butyl alcohol is heated to reflux, with stirring. There are added dropwise, over 30 minutes, 132 grams of cinnamaldehyde and 16.9 grams of a 10% solution of potassium hydroxide in n-butyl alcohol. The solution is heated at 95° C. for 3 hours. The product is a 50% solution in toluene and n-butyl alcohol of the desired diacetone acrylamide-cinnamaldehyde adduct.

EXAMPLE 7

A solution of 85 grams (0.5 mole) of diacetone acrylamide and 0.45 gram of trisodium phosphate in 140 grams of water is heated to 58° C., and a solution of 127 grams (0.55 mole) of 90% sodium o-benzaldehydesulfonate in 250 grams of water is added dropwise over one hour, with stirring. Stirring is continued for 5 hours, and the solution is then stripped at 60° C./20 mm. The resulting light tan solid is washed with toluene, dissolved in isopropyl alcohol and precipitated by adding the solution to toluene. The recrystallized solid, which is the desired adduct, is dried at 65° C.

EXAMPLE 8

Following the procedure of Example 1, a condensation product is prepared from 1 mole of diacetone acrylamide and 0.35 mole of terephthalaldehyde. During refluxing, the mixture solidifies due to precipitation of the product. The product is recrystallized from an ethanol-water mixture and recrystallized again from acetic acid, yielding a bright yellow solid melting at 215.5–216.5° C. and containing 71.6% carbon (theory 71.53%), 7.33% hydrogen (theory 7.39%), and 6.43% nitrogen (theory 6.42%).

EXAMPLE 9

Following the procedure of Example 2, a benzylidene derivative of diacetophenone acrylamide is prepared.

The compounds of this invention may be polymerized under free-radical conditions, either alone or in the presence of other monomers. The term "polymer," as used herein, includes addition homopolymers, copolymers, terpolymers and other interpolymers.

Polymerization by the free-radical method may be effected in bulk, solution, suspension or emulsion, by contacting the monomer or monomers with a polymerization initiator either in the absence or presence of a diluent at a temperature of about 0–200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like.

Suitable emulsifiers for use in the preparation of emulsion polymers of this invention include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose, gum arabic, dextrins or polyvinyl alcohol.

A large variety of polymerizable compounds can be used to form interpolymers of this invention. They include (1) esters of unsaturated alcohols, (2) esters of unsaturated acids, (3) esters of unsaturated polyhydric alcohols, (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

(1) Unsaturated alcohols and esters thereof: Allyl, methallyl, crotyl, 1-chloroallyl, 2-chloroallyl, cinnamyl, vinyl, methylvinyl, 1-phenallyl, butenyl alcohols, and esters of such alcohols with saturated acids such as acetic, propionic, butyric, valeric, caproic and stearic; with unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phenylacetic, phthalic, terephthalic and benzoylphthalic acids.

(2) Esters of saturated alcohols, such as methyl, ethyl, propyl, isopropyl, butyl, isobutyl, sec-butyl, tert-butyl, 2-ethylhexyl, cyclohexyl or behenyl alcohols, with unsaturated aliphatic monobasic and polybasic acids, examples of which are illustrated above.

(3) Esters of unsaturated polyhydric alcohols, e.g., butenediol, with saturated and unsaturated aliphatic and aromatic, monobasic and polybasic acids, illustrative examples of which appear above.

(4) Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether and allyl ethyl ether.

(6) Unsaturated ketones, e.g., methyl vinyl ketone and ethyl vinyl ketone.

(7) Unsaturated amides, such as acrylamide, methacrylamide, N-methylacrylamide, N-phenylacrylamide, N-allylacrylamide, N-methylolacrylamide, N-allylcaprolactam, diacetone acrylamide and 2-acrylamido-2-methylpropanesulfonic acid.

(8) Unsaturated aliphatic hydrocarbons, for instance, ethylene, propylene, butenes, butadiene, isoprene, 2-chlorobutadiene and alpha-olefins in general.

(9) Vinyl halides, e.g., vinyl fluoride, vinyl chloride, vinyl bromide, vinylidene chloride, vinylidene bromide, allyl chloride and allyl bromide.

(10) Unsaturated acids (for example, acrylic, methacrylic, propylacrylic), examples of which appear above.

(11) Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

(12) Unsaturated acid halides such as cinnamoyl, acrylyl, methacrylyl, crotonyl, oleyl and fumaryl chlorides or bromides.

(13) Unsaturated nitriles, e.g., acrylonitrile, methacrylonitrile and other substituted acrylonitriles.

Especially preferred as comonomers are the unsaturated aromatic compounds, notably styrene.

A second and preferred method for preparing the polymers of this invention is by the reaction of an aldehyde with a polymer of diacetone acrylamide, diacetophenone acrylamide or a homologous substituted acrylamide of the type which may also be used to prepare the monomeric compounds of this invention. For this purpose, the polymer is generally dissolved in a suitable solvent. As in the preparation of the monomeric compounds, an alkaline reagent is used; however, no more than about 2% (usually about 0.2–2.0%), based on the weight of substituted acrylamide units in the polymer, of said alkaline reagent is usually necessary. It is strongly preferred to add the alkaline reagent gradually (e.g., dropwise) to the reaction mixture. While it may in certain instances be possible to obtain some quantity of the polymer of this invention (usually in admixture with various by-products) when the alkaline reagent is present in its entirety from the beginning of the reaction, this is not the preferred method of operation and is not contemplated as being part of this invention. It is also preferred to add the aldehyde dropwise, simultaneously with the alkaline reagent.

The preparation of polymers of this invention is illustrated by the following examples. Inherent viscosities were determined on a 0.5% w./v. solution of the polymer in chloroform, at 30° C.

EXAMPLE 10

A mixture of 15 grams of the product of Example 2, 100 grams of water, 20 ml. of benzene, 0.01 gram of sodium lauryl sulfate, 0.15 gram of stearic acid and 0.1 gram of benzoyl peroxide is heated at 80° C., with stirring, for 18 hours. The polymer which precipitates is extracted with benzene and the benzene extracts are dried over magnesium sulfate and stripped. The desired homopolymer is then dissolved in benzene and precipitated by pouring into methanol. It has an inherent viscosity of 1.77.

EXAMPLE 11

A mixture of 25 grams of the product of Example 2, 75 grams of water, 25 ml. of benzene and 2 grams of sodium lauryl sulfate is heated under nitrogen at 50° C., with stirring, and a mixture of 2 ml. each of a 6.7% aqueous solution of ammonium persulfate and a 3% aqueous solution of sodium metabisulfite added. Stirring is continued overnight, whereupon polymerization takes place. The polymer is recovered by extracting with benzene, drying the benzene extracts over magnesium sulfate, evaporating, redissolving in benzene and precipitating by pouring into methanol.

EXAMPLE 12

A homopolymer of the product of Example 3 is prepared by dissolving two grams of the product in four grams of toluene and polymerizing in the presence of about 10 mg. of azobisisobutyronitrile. After polymerization is complete, the reaction mixture is poured into methanol and the precipitated polymer is washed with methanol and dried under vacuum. It has an inherent viscosity of 0.14.

EXAMPLE 13

The product of Example 4 (6 grams) is polymerized in 40 grams of water and 14 ml. of benzene, using about 20 mg. of azobisisobutyronitrile as an initiator. The desired homopolymer is recovered by pouring the reaction mixture into methanol, collecting the polymer, washing with methanol and drying.

EXAMPLE 14

The product of Example 4 (10 grams) is dissolved in 20 grams of tetrahydrofuran and 40 mg. of azobisisobutyronitrile is added. The solution is heated under nitrogen at 60° C. for 24 hours, whereupon a moderately viscous, yellow solution is obtained. It is poured into methanol and the precipitated homopolymer is washed with methanol and dried in a vacuum oven. It has an inherent viscosity of 0.33.

EXAMPLE 15

Following the procedure of Example 12, a homopolymer of the product of Example 5 is prepared. It has an inherent viscosity of 0.10.

EXAMPLE 16

A homopolymer of diacetone acrylamide is prepared by polymerizing 500 parts (2.96 moles) of diacetone acrylamide in a n-butyl alcohol-toluene solution, using cumene hydroperoxide as the initiator. To the homopolymer solution, maintained at 90° C. under nitrogen, are added dropwise 284 parts (2.96 moles) of furfural and 50 parts of a 10% solution of potassium hydroxide in n-butyl alcohol. The addition time is 30 minutes, during which time the temperature rises to 97° C. The mixture is heated under reflux for 4 hours and is then cooled, yielding a 30% solution of the desired polymer in toluene and n-butyl alcohol.

EXAMPLES 17–25

Following the procedure of Example 16, the reaction products listed in the following table are prepared from various diacetone acrylamide-styrene copolymers and aldehydes. In each instance the mole ratio of aldehyde to diacetone acrylamide units in the polymer is 1:1 and the solvent is a mixture of n-butyl alcohol and toluene, similar to that employed in Example 16.

| Example | Aldehyde | Weight ratio, diacetone acrylamide/styrene | Percent polymer in soln. |
| --- | --- | --- | --- |
| 17 | Furfural | 6:4 | 58 |
| 18 | do | 7:3 | 47 |
| 19 | do | 8:2 | 30 |
| 20 | do | 9:1 | 31 |
| 21 | Cinnamaldehyde | 3:7 | 43 |
| 22 | 2,4-hexadienal | 6:4 | 31 |
| 23 | Anisaldehyde | 6:4 | 34 |
| 24 | Benzaldehyde | 6:4 | 32 |
| 25 | Salicylaldehyde | 6:4 | 32 |

The monomers and polymers of this invention are photosensitive and undergo photochemical reaction when exposed to radiation in the range of 2200–5000 A. Ordinarily, ultraviolet radiation, especially in the range 2200–2900 A., is preferred; such radiation may be provided, for example, by a carbon arc or mercury vapor lamp.

Frequently, photochemical reaction of the monomers and polymers of this invention must be initiated or is promoted by the action of a sensitizer. Suitable sensitizers are known to those skilled in the art and include such compounds as xanthone, 2-acetylfluorenone, duroquinone, $\beta$-naphthil, benzoquinone, camphorquinone, eosin, propiophenone, cyclopropyl phenyl ketone, acetophenone, 1,3,5-triacetylbenzene, benzaldehyde, o-dibenzoyl-benzene, benzophenone, thioxanthone, 2 - acetylfluorene, anthraquinone, flavone, Michler's ketone, acetylbiphenyl, $\beta$-naphthyl phenyl ketone, $\beta$ - acetonaphthone, $\beta$-naphthaldehyde, $\alpha$-acetonaphthone, $\alpha$-naphthaldehyde, $\alpha$-naphthyl phenyl ketone, biacetyl, 2,3-pentanedione, benzil, fluorenone, 1,2,5,6-dibenzanthracene, pyrene, benzanthrone, 3-acetylpyrene, 9,10-dimethyl-1,2-dibenzanthracene, anthracene and 9,10-dibromoanthracene. The amount of sensitizer required varies over a wide range; generally, about 1–20% by weight of the monomer or polymer of this invention is preferred. However, many of the compounds of this invention, when exposed to ultraviolet radiation in the wavelength range described above, undergo the photochemical reaction in the absence of a sensitizer.

The photochemical reaction of the polymers of this invention results in crosslinking and forms a product which is insoluble in many solvents. Thus, the polymers of this invention are useful in the preparation of masters for lithographic or relief printing, in etching operations for the preparation of photoresists, and the like. For this purpose, a solution of the polymer (optionally with a sensitizer) is coated upon a support material. In some cases it is advantageous to add a pigment to the polymer solution. The coating operation can be accomplished by any means known to those skilled in the coating art, such as whirler coating, dipping, swabbing, hopper coating, drawing down and doctor blade coating. Coating thickness is a function of intended use, and its limits are only those imposed by the concentrations of the coating compositions and the technology presently available to those skilled in the coating art. Typically, the coating thickness is about 0.001–0.005 inch.

The choice of a support material for the polymer coating depends upon the use to which the complete photographic element will be applied. Metals such as copper, tin, aluminum and zinc can be used, especially for the preparation of lithographic printing plates. Metal laminates, where a thin layer of metal such as copper is bonded to a polymeric base material, are particularly suitable where subsequent etching is involved, such as in the preparation of printed circuits. Glass, paper and photographic film bases such as cellulose acetate, polystyrene, cellulose nitrate, cellulose acetate butyrate, polyethylene-coated paper and poly(ethylene terephthalate) are also useful as support materials.

After coating, the photographic element is exposed imagewise and the radiation-sensitive polymer layer is hardened and rendered insoluble by crosslinking in the exposed areas. Development is then accomplished by treating the exposed photographic element with a solvent (typically but not necessarily the coating solvent) for the radiation sensitive resin by spraying, dipping, brushing or the like, whereupon the polymer in the unexposed areas is dissolved away. An exposed imagewise distribution of polymer remains, constituting a negative reproduction of the original pattern. This negative polymer image is both hydrophobic and ink-receptive.

As an illustration of the photochemical crosslinking of the polymers of this invention, the polymers of any of Examples 16–21 may be diluted with toluene to a solids content of 5–25% and coated (e.g., by dip coating or drawing down) on grained aluminum panels. After the solvent has evaporated, the panels are partially covered by a stencil and are exposed to mercury vapor or carbon arc lamp radiation for about 10 minutes whereupon photochemical crosslinking of the exposed polymer occurs. The stencil is then removed and the resulting plate is developed by dissolving the unreacted polymer in toulene, perchloroethylene, tetrahydrofuran, acetone, acetone-ethylene glycol mixtures, or similar solvents, producing a lithographic printing plate.

Photoresists, suitable for the preparation of printed circuits and the like, may be produced by forming a coating of (e.g.) the product of Example 17 on a copper-clad glass fiber-epoxy resin panel, developing as described above, and then etching the exposed copper with ferric chloride.

What is claimed is:

1. A crosslinked composition of matter prepared by exposing to radiation in the range of 2200–5000 A. an addition polymer of a compound or mixture of compounds of the formula (I)
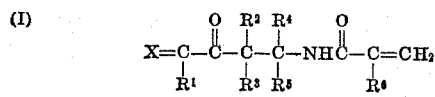

wherein:
X is two hydrogen atoms or Y;
Y is $R^7CH=$;
each of $R^1$, $R^4$ and $R^5$ is hydrogen or a hydrocarbon or substituted hydrocarbon radical;
each of $R^2$ and $R^3$ is hydrogen or a hydrocarbon or substituted hydrocarbon radical, or $(R^2+R^3)$ is Y; with the proviso that at least one of $(R^2+R^3)$ and X is Y;
$R^6$ is hydrogen, halogen or a lower alkyl radical; and
$R^7$ is a hydrocarbon or substituted hydrocarbon radical containing conjugate olefinic or aromatic unsaturation with respect to the olefinic bond in Y.

2. A composition according to claim 1 wherein $R^1$ is hydrogen; each of $R^2$ and $R^3$ is hydrogen, or $(R^2+R^3)$ is Y; each of $R^4$ and $R^5$ is methyl; $R^6$ is hydrogen; and $R^7$ is a furfuryl, phenyl, substituted phenyl, 2-phenylvinyl or 1,3-pentadienyl radical.

3. A composition according to claim 2 wherein the addition polymer is an interpolymer of said compound or mixture of compounds with at least one polymerizable vinyl monomer.

4. A composition according to claim 3 wherein the polymerizable vinyl monomer is an unsaturated aromatic compound.

5. A composition according to claim 4 wherein the aromatic compound is styrene.

6. A composition according to claim 5 wherein $R^7$ is furfuryl.

7. A composition according to claim 6 wherein the radiation is ultraviolet radiation.

References Cited

UNITED STATES PATENTS 3,518,326   6/1970   Forsberg _____ 260—828

SAMUEL H. BLECH, Primary Examiner

R. B. TURER, Assistant Examiner

U.S. Cl. X.R.

96—35.1, 36.2, 115 P; 117—93.31, 132 BF, R, 138.8 R, G; 204—159.18, 159.19, 159.22; 260—63 UY, 64, 65, 347.3